(12) United States Patent
Wetli

(10) Patent No.: US 6,893,195 B2
(45) Date of Patent: May 17, 2005

(54) METHOD AND APPARATUS FOR PRODUCING FORKED ROOTS OF TURBINE BLADES

(75) Inventor: Markus Wetli, Dintikon (CH)

(73) Assignee: Walter AG, Tubingen (DE)

( * ) Notice: Subject to any disclaimer, the term of this patent is extended or adjusted under 35 U.S.C. 154(b) by 52 days.

(21) Appl. No.: 10/667,572

(22) Filed: Sep. 23, 2003

(65) Prior Publication Data

US 2004/0105732 A1 Jun. 3, 2004

(30) Foreign Application Priority Data

Sep. 27, 2002 (DE) .......................... 102 45 197

(51) Int. Cl.⁷ .............................. B23C 3/00; B23C 3/18; B23C 3/28; B23C 3/34
(52) U.S. Cl. .................... 409/132; 409/232; 407/31; 407/51; 407/57; 407/58; 407/60; 407/61; 29/557; 29/889.7; 29/889.2
(58) Field of Search ................................ 409/132, 131, 409/232, 234; 407/31, 33, 43, 47, 48, 51, 52, 55, 56–58, 60–61, 64; 29/557, 889, 889.2, 889.6, 889.7

(56) References Cited

U.S. PATENT DOCUMENTS

| 1,614,558 | A | * | 1/1927 | Kasley ....................... 409/131 |
| 3,260,158 | A | | 7/1966 | Chiffolot et al. |
| 3,646,848 | A | | 3/1972 | Matthey |
| 4,242,020 | A | * | 12/1980 | Schmid ....................... 409/234 |
| 4,537,538 | A | * | 8/1985 | Mitamura et al. ........... 409/232 |
| 4,697,963 | A | * | 10/1987 | Luck ............................. 407/48 |
| 5,154,553 | A | * | 10/1992 | Baumstark .................... 407/31 |
| 5,158,400 | A | * | 10/1992 | Skinner et al. ............... 407/29 |
| 5,430,936 | A | * | 7/1995 | Yazdzik et al. ............. 29/889.2 |
| 5,676,505 | A | | 10/1997 | Gauss et al. |
| 5,911,548 | A | * | 6/1999 | Deiss et al. ................. 409/234 |
| 5,931,616 | A | | 8/1999 | Daub |
| 6,322,296 | B1 | * | 11/2001 | Wetli et al. ................... 407/42 |

FOREIGN PATENT DOCUMENTS

DE 199 42 542 3/2001

OTHER PUBLICATIONS

Derwent abstract for DE 19942542–A1, published Mar. 8, 2001.*
European Search Report dated Nov. 27, 2003.

* cited by examiner

Primary Examiner—Erica Cadugan
(74) Attorney, Agent, or Firm—Burns, Doane, Swecker & Mathis, LLP

(57) ABSTRACT

For producing forked roots of turbine blades, the turbine blades are, in a first step, roughed-in and smoothed (finished) on their outer faces in a single operation with two rigidly coupled disk milling cutters that are provided hard metal cutter inserts. In a second step, the forked root is formed with fingers by a set of rigidly coupled disk milling cutters that are provided with hard metal cutter inserts. The disk milling cutters form slots in the forked root. All of the slots are simultaneously opened (roughed-in) and smoothed (finished), the slots having parallel walls.

21 Claims, 4 Drawing Sheets

METHOD AND APPARATUS FOR PRODUCING FORKED ROOTS OF TURBINE BLADES

This application claims priority under 35 U.S.C. §§ 119 and/or 365 to patent application Ser. No. 10245197.4 filed in Germany on Sep. 27, 2002, the entire content of which is hereby incorporated by reference.

BACKGROUND

The invention relates to a method for milling deep slots for producing a plurality of walls, parallel to one another, on a workpiece, of the needed for instance to produce forked roots of turbine blades, and to an appropriate milling tool for the purpose.

Larger turbines, such as steam turbines, have a rotor that carries many blades. They are retained in corresponding slots provided in the rotor shaft. One structural form of the turbine roots is known as forked roots. These forked roots have a plurality of walls substantially parallel to one another, between which deep slots are formed. With these walls, also known as fingers, the blade root is seated in corresponding slots of the rotor shaft.

In a prior art production method for the blade roots, the slots are first preroughed in a first work station with a milling tool that is formed by a row of HSS disk milling cutters joined together in a manner fixed against relative rotation and seated on a common shaft. Cutting speeds of 20 m/min are attainable, which is equivalent to feeding speeds of 10 to 12 mm/min. For a blade root whose slots can have a depth of between 50 mm and 120 mm, the result is a machining time solely for opening the slots that is up to ten minutes long.

In a second work step, the preroughed slots are then smoothed with another milling tool. This milling tool has a row of disk-like smoothing milling cutters held on a shaft. The two operations are performed in separate stations that the turbine blades pass through in succession. There is a need to shorten the machining time.

From German Patent No. 44 31 841 (corresponding Gauss et al. U.S. Pat. No. 5,676,505), milling of deep slots in generator rotors or turbine rotors in a two-step method is known. The turbine rotor has relatively deep slots that serve to receive windings. The slots are each opened individually with a disk milling cutter that has rough cutters on its circumference and smooth cutters on its sides. Although here the slots are open in two steps, the rough machining and the smooth machining are combined in each step.

The length of the slots exceeds their depth by far. Thus parts of the slot wall located ahead of the milling cutter and behind the milling cutter can stabilize the slot wall that is being milled at the moment. Moreover, each slot wall is machined on only one flank.

The object of the invention is to create a method for milling deep slots for producing a plurality of walls parallel to one another in a workpiece that has a shortened machining time. In particular, the method should be suitable for producing forked roots of turbine blades.

SUMMARY OF INVENTION

A method aspect of the invention is based on the simultaneous opening of a plurality of deep slots, parallel to one another, with a plurality of disk milling cutters seated on a common shaft that perform both the roughing-in operation and the smoothing operation. In the production of forked roots, the slot depth amounts as a rule to from 30 mm to 120 mm, while the roots themselves are from 40 mm to 350 mm long. The walls, also known as fingers, remaining between the slots, for a slot width of 8 mm to 25 mm, as a rule have a thickness of only 2.5 mm to 12 mm. Intrinsically, the fingers have a considerable flexibility, which makes precise machining of the slot flanks difficult. In the machining according to the invention, however, the roughing-in machining operation and the smoothing operation of all the slot walls takes place through the cutters, located on the outer circumference of the disk milling cutters, in the immediate vicinity of the solid material. Elastic wall warping, that is, the deflection of the wall ahead of the cutter, need not be feared here. If the disk milling cutters are embodied in graduated form, the roughing-in machining operations and smoothing operations each take place at steps or shoulders embodied on the slot walls, or in other words always at the transition to whichever is the greater wall thickness. Thus the smoothing operation can be performed at a stabler wall than would be the case if the slots were first completely opened and only then smoothed. Despite roughing-in machining operations that occur at the same time as the smoothing, the cutting speed can thus be increased to approximately 80 m/min. This leads to feeding speeds of up to 100 mm/min. The machining time for a forked root can thus be reduced substantially compared to known methods.

The method can furthermore be employed with workpieces in which the walls to be separated by slots, measured in a direction parallel to the slot bottom, are the same length as or shorter than the height of the walls, measured perpendicular to the slot bottom. Such short walls are extremely flexible and are thus critical to machine. However, it has surprisingly been found that by the simultaneous machining of all the walls, bracing of the walls against the tools occurs, which prevents vibration or deflection of the walls. The bracing is so good that a good outcome of smoothing is achieved.

In the method of the invention, preferably all the slots to be made are made in a single operation. As a result, the aforementioned advantages are attained to a particularly great extent. The feeding direction of the milling tool is defined as parallel to the slot bottom. As a result, a flat slot bottom is created at the very outset. However, positioning motions at right angles to the slot bottom are also possible, optionally combined with a parallel motion to the slot bottom.

The relative motion between the milling tool and the workpiece can be oriented either in or counter to the milling direction. The motion in the milling direction is preferred (synchronous rotation), in order not to damage fragile walls.

In the production of forked roots of turbine rotors, the outer faces, pointing away from one another, of the forked root that are embodied on the fingers farthest away from each other are created in a separate machining operation with disk milling cutters that are equipped with hard metal cutter inserts. These disk milling cutters likewise perform both the rough machining and the smooth machining. Preferably, all the machining of the forked root is done in a two-stage process, in the first stage of which the aforementioned machining of the outer faces of the forked root is done. In the second stage, the opening and smoothing of the slots takes place. The machining of the outer faces is thus done on the solid material, from which only in the next step the fingers are made by milling out deep slots. In this way, precise forked roots can be produced in a method that is not very time-consuming.

The method of the invention is preferably employed with a milling tool that has a plurality of disk milling cutters disposed on a common shaft. Each of these disk milling cutters are equipped with a plurality of hard metal cutter inserts, which are to be brought simultaneously into engagement with the workpiece. The cutter inserts define roughing cutter edges on the circumference of the disk milling cutters and smoothing cutter edges on the flanks. They can be embodied as graduated in cross section, resulting in further roughing cutter edges and smoothing cutter edges, in each case on annular shoulders of each disk milling cutter. The disk radius is greater than the slot depth. Preferably it is also greater than the slot length. This has the advantage that in a rectilinear relative motion between the tool and the workpiece parallel to the slot bottom to be produced, the forward driving direction in which the milling cutter machines into the solid material is effected at an angle to the slot bottom that is not particularly acute. From the standpoint of vibration, this is favorable and brings about a good result of the work.

The disk milling cutters are embodied identically to one another and are rigidly joined to the shaft. If needed, the disk milling cutters can also be embodied differently, to create other kinds of slot profiles.

The disk milling cutters are preferably retained on the shaft in an orientation that is identical from one to the other. As a result, one cutter insert of one disk milling cutter is axially adjacent each cutter insert of each other disk milling cutter. The applicable cutter inserts, between themselves, brace the fragile wall that has been exposed.

In individual cases, it can also be expedient to provide an angular offset between adjacent disk milling cutters, for instance to reduce vibration.

For machining the outer faces of a forked root, a separate milling tool can be provided, which has only two disk milling cutters that are equipped with hard metal cutter inserts. The disk milling cutter is preferably assigned a setting device for setting the axial spacing. Thus the position of the outer faces of the forked root can be defined precisely relative to one another.

The milling tool for the outer faces of the forked root and the milling tool for its slots form a tool set that can be used to machine a forked root. The corresponding milling machine has two machining stations, namely one for each tool of the tool set. Thus the machining of forked roots can be done on conventional milling machines with two machining stations. The first machining station, which in the past was used to open the slots using HSS tools, now serves to machine the outer faces. The second machining station, which previously had to perform the smoothing machining, now serves to open and smooth all the slots. Nevertheless, a substantially shortened machining time is achieved.

BRIEF DESCRIPTION OF DRAWINGS

Advantageous details of embodiments of the invention will become apparent from the drawing, description, or dependent claims. In the drawing, the invention is explained in terms of one exemplary embodiment. Shown are:

DESCRIPTION OF PREFERRED EMBODIMENTS OF THE INVENTION

Figure 1:
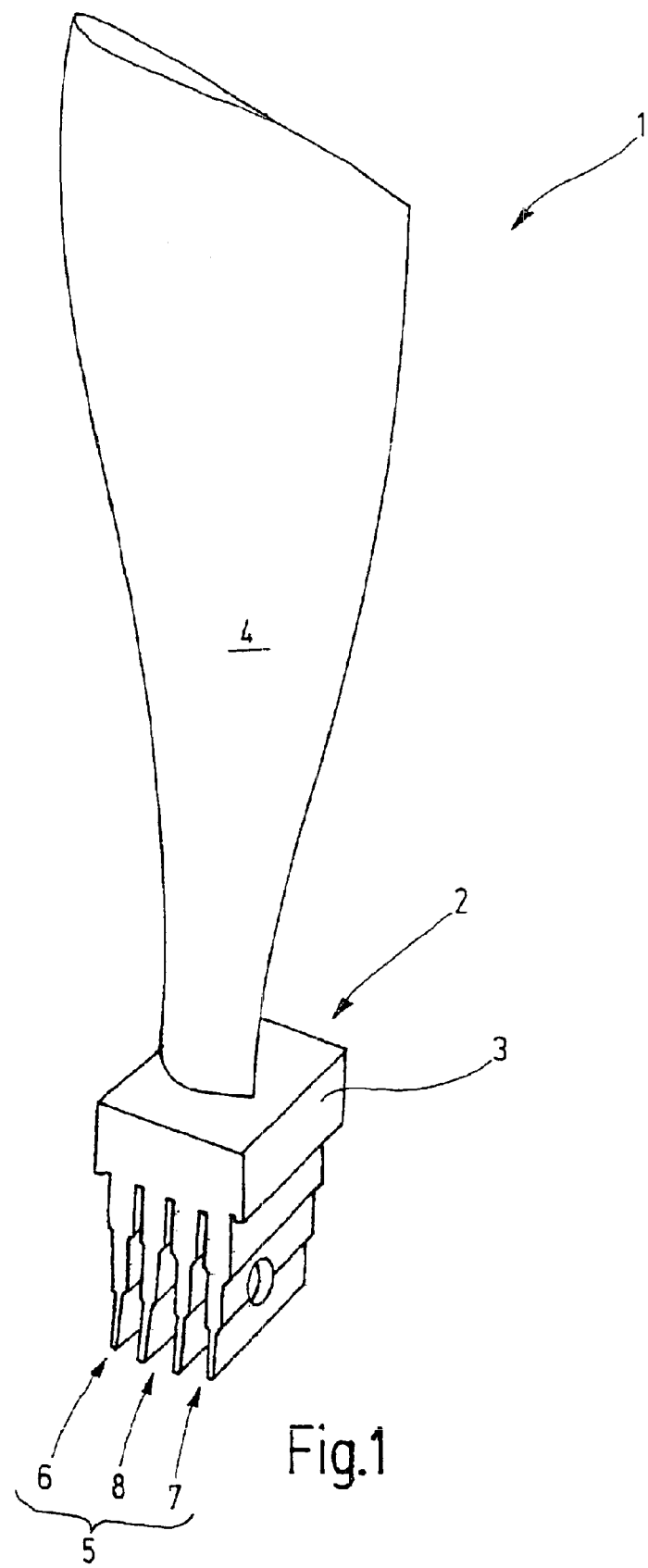
FIG. 1, a turbine blade with a forked root.
Figure 2:
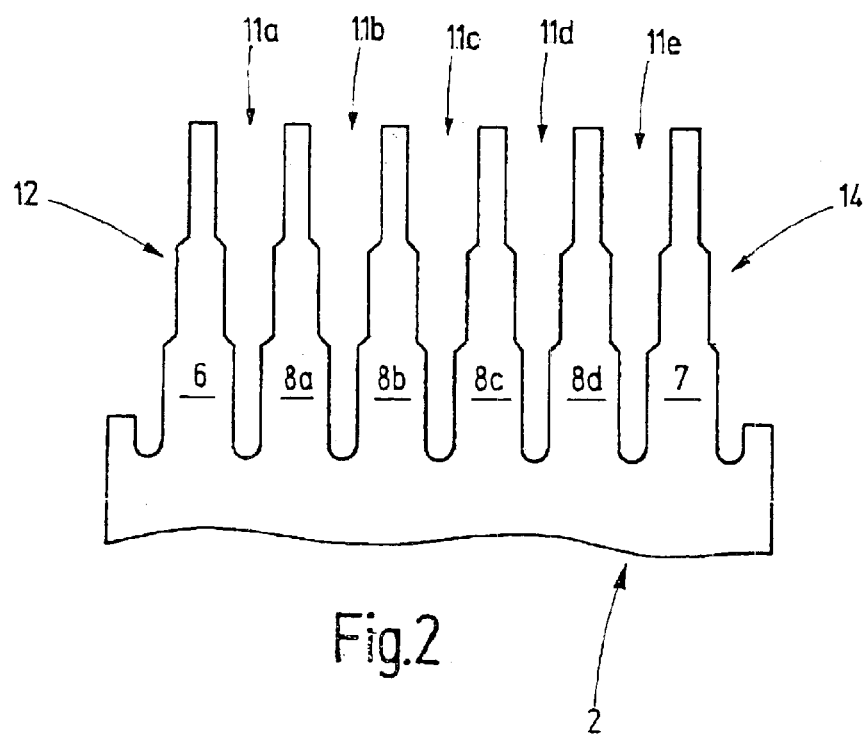
FIG. 2, the forked root in a view from the front and in a detail.

In FIG. 1, a turbine blade 1 is shown that has a forked root 2. The forked root is used to secure the turbine blade 1 to a turbine shaft that has corresponding receiving slots. The forked root 2 has an approximately block-shaped bottom portion 3, from the flat top side of which the turbine runner 4 extends. On the opposite side, the bottom portion 3 has a plurality of walls 5, for instance four or six of them. These walls are arranged parallel to one another in a row, so that there are outermost walls 6, 7 and walls 8 disposed between them. The walls 5 are preferably embodied identically to one another. They can have a height of 30 mm to 100 mm or 120 mm. In length, depending on the embodiment, they measure from 40 mm to 350 mm. The walls 5 are also called fingers. FIG. 2 shows a six-fingered forked root 2. As can be seen from FIG. 2, the walls 5 can each have a graduated cross section. Between them, they enclose slots 11a–11e. The slots 11a–11e are embodied identically to one another. They can be embodied in graduated form in terms of their depth. As the depth increases, they thus become narrower in stages.

The outermost walls 6, 7 are parts that determine precision. Their outer faces 12, 14 must be embodied precisely in terms of their spacing from one another.

Figure 3:
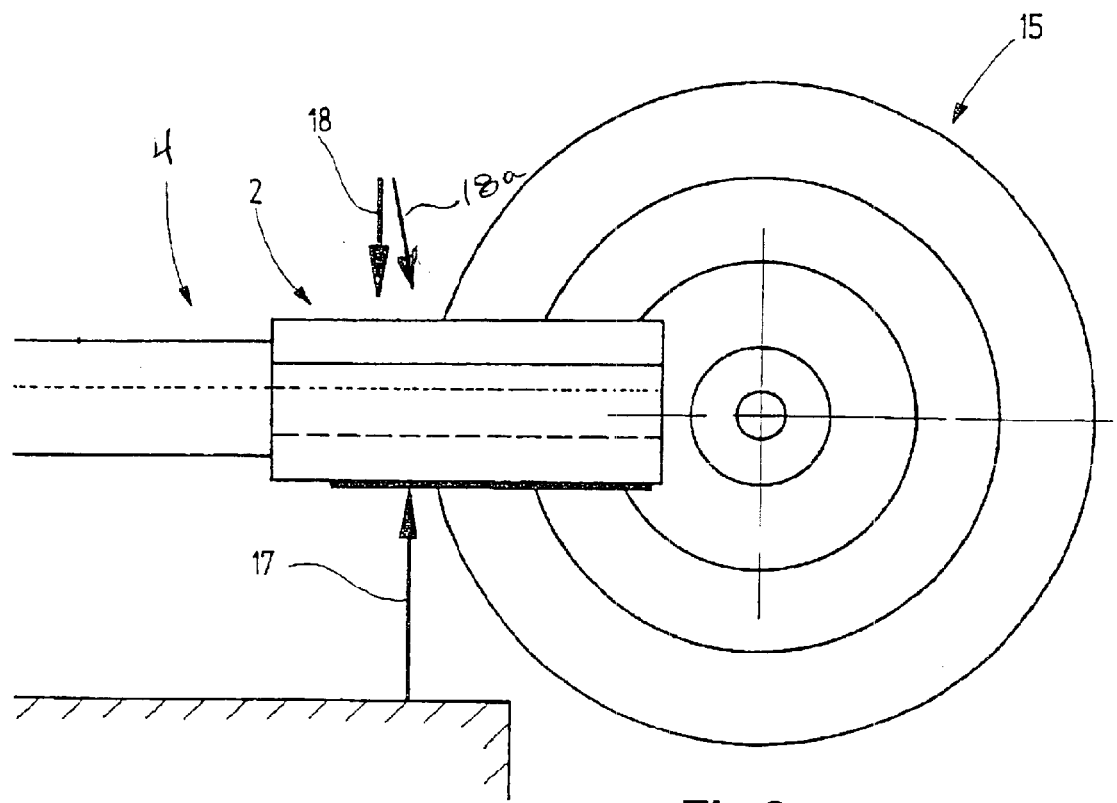
FIG. 3, the production of the forked root in a milling operation in a schematic view.
Figure 5:
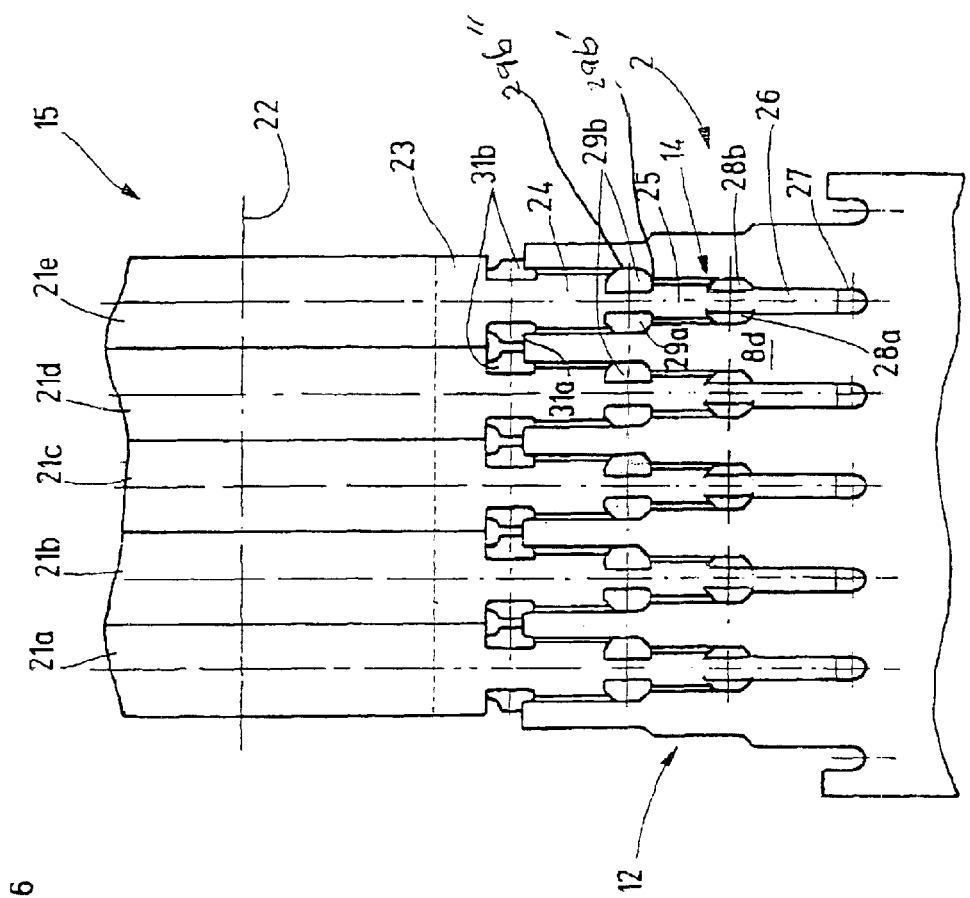
FIG. 5, the machining of the slots of the forked root in a schematic view.
Figure 4:
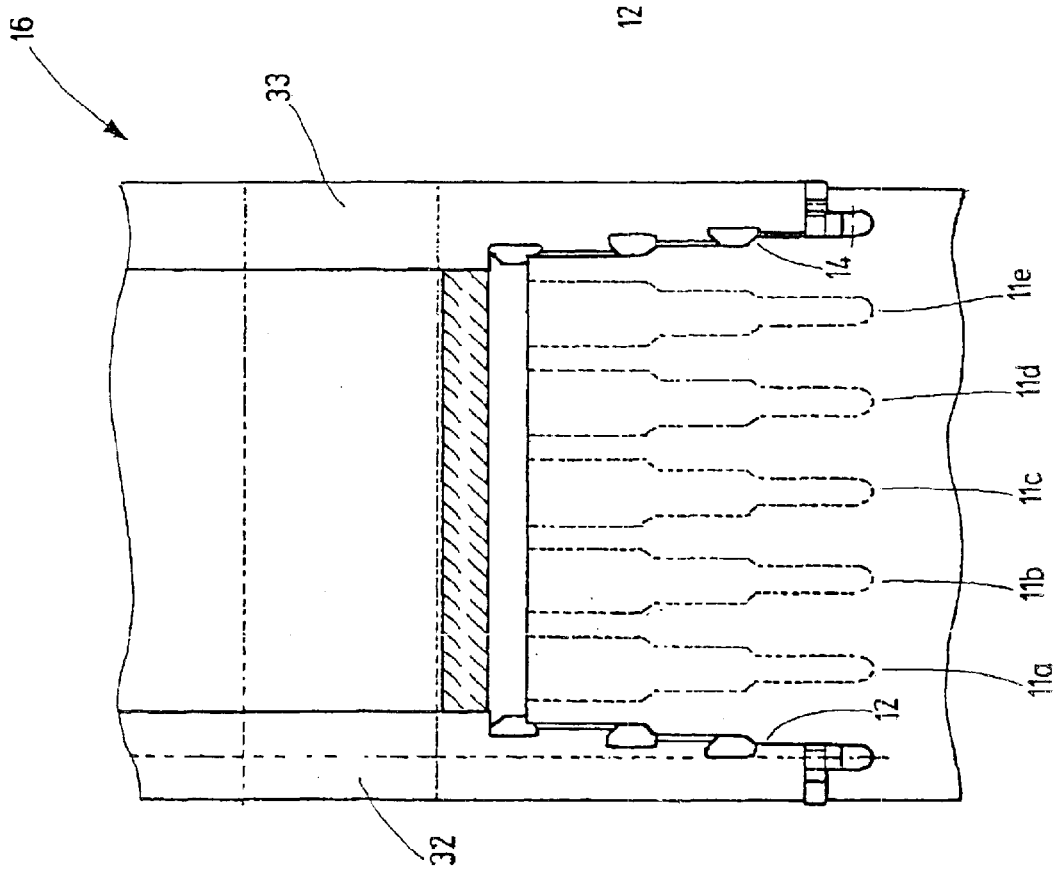
FIG. 4, the machining of the outer flanks of the forked root in a schematic view.

FIG. 3 illustrates the production of the forked root 2 with the aid of two milling tools described in further detail hereinafter. In FIG. 3, a milling tool 15 of FIG. 5 is used, which is used to open the slots 11a–11e. A milling tool 16 used to machine the outer faces 12, 14 is shown in FIG. 4 and will also be described in further detail hereinafter.

For the milling and finish-machining of the slots 11a–11e, the forked root 2 is held in stationary fashion by a support, indicated only schematically in FIG. 3 by an arrow 17. The rotating milling tool 15 is then moved along a path 18 symbolized by an arrow through the solid material of the forked root 2, in order to open the slots 11. The path 18 is parallel to a slot bottom. Alternatively, the path 18 could be non-parallel to, i.e., inclined with respect to, the slot bottom.

FIG. 5 illustrates the milling tool 15. For each slot 11a–11e, this milling tool has one disk milling cutter 21a–21e, respectively, which are all embodied identically to one another. The disk milling cutters 21a–21e are retained in a manner fixed against relative rotation on a shaft 22, shown only schematically in FIG. 5. They rest with their flat sides against one another. Their thickness in the axial direction matches the spacing of the forked root 2. Outside the hub portions 23, contacting one another, of the disk milling cutters 21a–21e, the disk milling cutters 21a–21e have disk portions 24, 25, 26. The radially outermost disk portion 26 is narrower, measured in the axial direction (i.e., parallel to the axis of rotation), than the portion 25, which in turn is narrower than the portion 24. On the outer circumference of each portion and on the outer circumference of the hub portion 23, there are sets of hard metal cutter inserts 27, 28a, 28b, 29a, 29b, 31a, 31b, whose circumferential cutter edge portion serves to perform the rough machining, and whose axial cutter edge portion serves to perform the smooth machining.

Thus, for example, there would be a plurality of the inserts 29b spaced apart in the circumferential direction of the disk portion 24. All of the inserts 29b (as well as the inserts 31b, 28b and 27) would be visible if the tool 15 were viewed in a direction parallel to the axis of rotation. The inserts are not seen in FIG. 3, because that figure merely shows the tool schematically without the inserts. Each of the inserts 29b has a circumferential edge 29b' for making a roughing cut, and a radial or flank edge 29b" for making a finishing cut, as do all of the other inserts.

The inserts 28a, 28b are spaced radially inwardly and axially outwardly from the inserts 27; the inserts 29a, 29b are spaced radially inwardly and axially outwardly from respective inserts 28a, 28b; and the inserts 31a, 31b are spaced radially inwardly and axially outwardly from respective inserts 29a, 29b. Thus, for example, the inserts 29b are spaced farther from a center line of the respective disk milling cutter 21e than are the inserts 28b.

In order to perform a cutting operation, the tool 15 would be initially oriented in a position above that shown in FIG. 3, i.e., out of contact with the workpiece, and then would be advanced toward the workpiece 4 in the direction 18 (or in a direction disposed at an inclination relative to the direction 18, e.g., the direction 18a, while being rotated.

Figure 6:
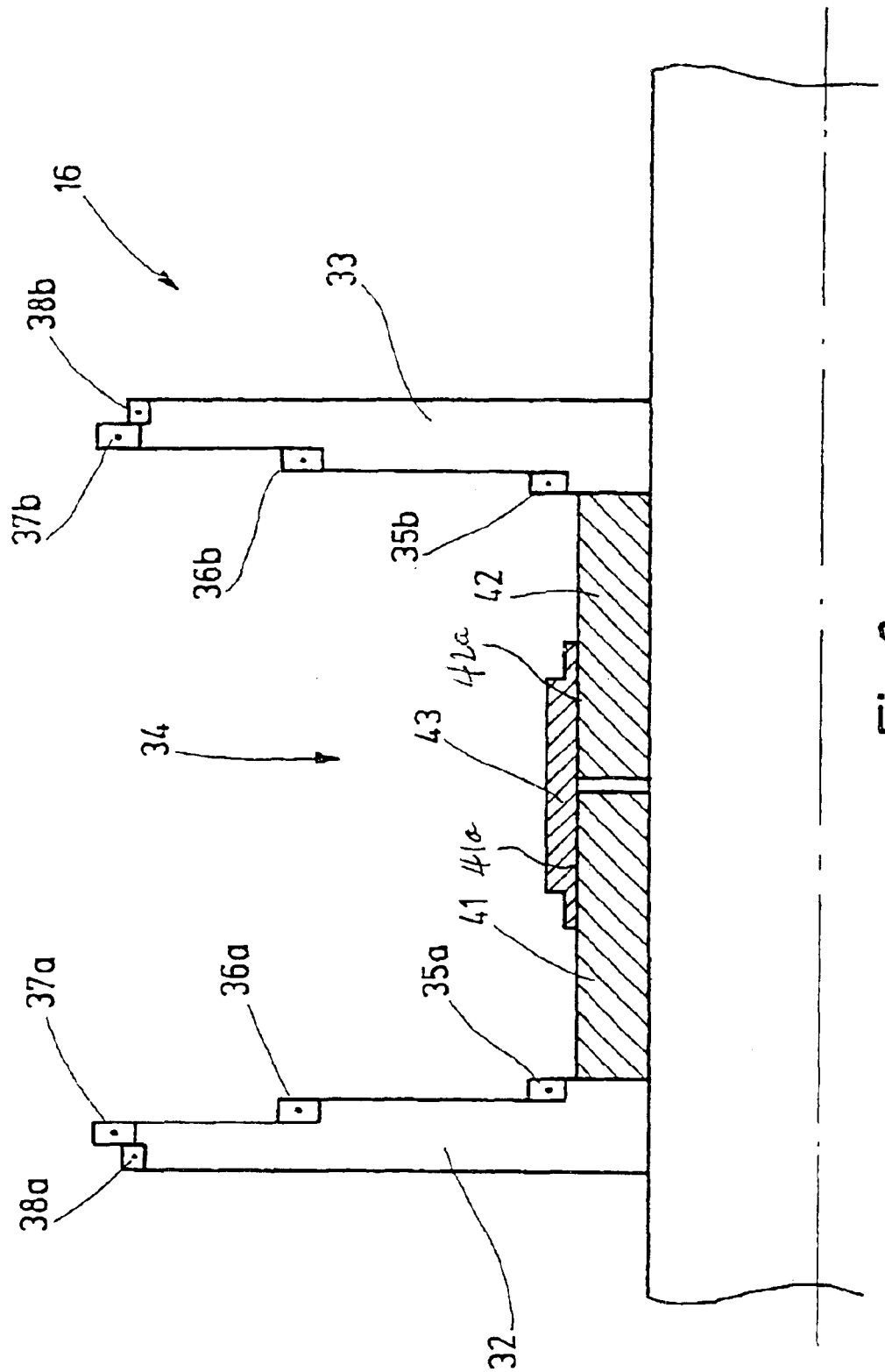
FIG. 6, an apparatus for setting the axial spacing of disk milling cutters.

FIG. 4 illustrates the milling tool 16 for machining the outer faces 12, 14. It contains two disk milling cutters 32, 33, which are mounted on a common shaft. The disk milling cutters 32, 33 are kept at a settable axial spacing by a setting device 34, shown in FIG. 6. On their sides pointing toward one another, the disk milling cutters 32, 33 have hard metal cutter inserts 35, 36, 37, 38 at corresponding intervals, which define and determine the contour of the outer faces 12, 14. The disk milling cutters 32, 33 are preferably oriented in different alignments to one another, so that adjacent cutting plates 35a, 35b have an angular offset to the pivot axis from one another. This prevents the occurrence of interfering vibration.

The adjusting device 34 has two cylindrical bushes 41, 42, provided with male threads 41a, 42a, onto which a cylindrical setting sleeve 43 is screwed. The threads of the two bushes 41, 42 have a different pitch, so that a rotation of the setting sleeve 43 counter to the bushes 41, 42 brings about a change in the axial length of the adjusting device 34.

The milling tools 15, 16 jointly form one tool set, which is used to produce a forked root 2 as follows:

For performing a first operation, the milling tool 16 in a first work station and the milling tool 15 in a second work station are connected to a work spindle. The blank of the turbine blade 1 is then first positioned in the first work station. What will later be the forked root is still formed here by a block of solid material. This block, as indicated in similar fashion in FIG. 3, is first supported in stationary fashion, after which the rotating milling tool 16 is brought into position transversely to the length of the blade 4. The disk milling cutters 32, 33 machine the outer faces 12, 14 in the process, and the circumferential cutting edges of the hard metal cutter inserts perform the rough machining. The axial cutting edges take on the smooth machining task. The outer faces 12, 14 are retained in stationary fashion while they are machined. Because of the slots 11, which have not yet been opened and are represented only by dotted lines in FIG. 4, the block of material is still quite rigid.

The blade root 2, finish-machined on its outer faces 12, 14, is now sent onward to the next machining station. The milling tool 15 is now brought into position without any particular provision for bracing the outer faces 12, 14. Once again, this bringing into position is preferably done transversely to the longitudinal direction of the blade, that is, parallel to the bottom of the slots 11a–11e that are being opened. The rough machining is effected on the slot bottom by means of the cutter inserts 27. Here, a completely rigid bracing of the work regions is provided for. The rough machining of the cutter inserts 28a, 28b is effected at relatively thick wall regions. The rigidity of the wall here is still quite high. The rough machining by the cutting inserts 29 is done in a region of the walls that has already been cut free. The total chipping volume here is slight in comparison to the total volume of the slots. Moreover, bracing of the slot walls is effected at the cutter insert that engages the respectively opposite wall side. For instance, the wall 8d (FIG. 5) is fixed between a plurality of cutter inserts. The same is true for the cutter inserts of adjacent disk milling cutters.

The hard metal cutter inserts make high cutting speeds possible and thus high feeding speeds. Opening all the slots 11a–11e in a single operation with roughing-in and smoothing results in a short machining time. The prior roughing-in and finish-machining of the outer faces 12, 14 leads to high precision of these faces, which can no longer be impaired by later machining steps in the opening of the slots 11a–11e.

For producing forked roots 2 of turbine blades 1, the turbine blades are first, in a first step, roughed-in and smoothed on their outer faces 12, 14 in a single operation, using two rigidly coupled disk milling cutters 32, 33 that are provided with hard metal cutter inserts. In a second operation, the fingers of the forked root are produced, in that with one set of rigidly coupled disk milling cutters that are provided with hard metal cutter inserts, all the slots are simultaneously opened (roughed-in) and smoothed.

Although the invention has been described in connection with preferred embodiments thereof, it will be appreciated by those skilled in the art that additions, modifications, substitutions and deletions not specifically described may be made without departing from the spirit and scope of the invention has defined in the appended claims.

What is claimed is:

1. A method of milling a plurality of parallel walls in a workpiece, the method utilizing a milling tool having a plurality of disk milling cutters disposed on a common shaft, each disk milling cutter including a plurality of circumferentially spaced hard-metal cutter inserts that form cutter edges, the method comprising the steps of:
    A) rotating the tool about an axis of rotation;
    B) producing, during step A, relative movement between the workpiece and the tool in a feed direction to bring the disk milling cutters simultaneously into contact with the workpiece; and
    C) continuing the relative movement of step B wherein the disk milling cutters simultaneously cut respective slots in the workpiece, with first cutter edge portions thereof performing a roughing cut, and second cutter edge portions thereof simultaneously performing a finishing cut, to form each slot with parallel walls.

2. The method according to claim 1 wherein the cutter inserts on each disk milling cutter include cutter inserts that are spaced apart both radially and axially, with radially inner ones of the cutter inserts being spaced axially farther from a center line of the respective disk milling cutter than are radially outer ones of the cutter inserts, wherein during step C the radially outermost inserts engage the workpiece prior to the radially innermost inserts.

3. The method according to claim 1 wherein the feed direction is oriented parallel to a bottom of the slots.

4. The method according to claim 1 wherein the feed direction is oriented at an oblique angle to a bottom of the slots.

5. The method according to claim 1 wherein during step A the tool is rotated such that the tool rotates through the workpiece in the direction of feed.

6. The method according to claim 1 wherein during step A the tool is rotated such that the tool rotates through the workpiece in a direction counter to the feed direction.

7. The method according to claim 1 wherein the tool constitutes a first tool, the disk milling cutters comprise first disk milling cutters, and the hard-metal cutter inserts constitute first inserts, the method further comprising the steps of:

D) providing a second tool comprising a pair of second disk milling cutters spaced axially apart and including respective surfaces facing each other in the direction of the axis, each surface carrying a plurality of circumferentially spaced second hard-metal cutter inserts;

E) rotating the second tool about an axis of rotation;

F) producing, during step E, relative movement between the workpiece and the tool in a feed direction, to bring the second disk milling cutters simultaneously into contact with the workpiece; and G) continuing the relative movement of step F wherein the two second disk milling cutters cut respective axially facing outer faces in the workpiece, the outer faces facing away from one another, with first cutter edge portions of the second inserts performing a roughing cut, and second cutter edge portions of the second inserts performing a finishing cut.

8. The method according to claim 7 wherein the cutter inserts on each second disk milling cutter include cutter inserts that are spaced apart both radially and axially, with radially inner ones of the second cutter inserts being spaced axially farther from a center line of the respective second disk milling cutter than are radially outer ones of the second cutter inserts, wherein during step F the radially outermost inserts engage the workpiece prior to the radially innermost inserts.

9. The method according to claim 7 wherein steps D–G are performed prior to steps A–C.

10. The method according to claim 7 wherein steps D–G are performed after steps A–C.

11. A method of milling a plurality of parallel walls in a forked root of a turbine blade, the method utilizing a milling tool having a plurality of disk milling cutters disposed on a common shaft, each disk milling cutter including a plurality of circumferentially spaced hard-metal cutter inserts that form cutter edges, the method comprising the steps of:

A) rotating the tool about an axis of rotation;

B) producing, during step A, relative movement between the forked root and the tool in a feed direction to bring the disk milling cutters simultaneously into contact with the forked root; and C) continuing the relative movement of step B wherein the disk milling cutters simultaneously cut respective slots in the forked root, with first cutter edge portions thereof performing a roughing cut, and second cutter edge portions thereof simultaneously performing a finishing cut, to form each slot with parallel walls.

12. A milling tool for milling a plurality of parallel walls in a workpiece comprising a plurality of disk milling cutters rotatable about a common axis; each disk milling cutter including a plurality of hard metal cutter inserts arranged in circumferentially spaced relationship, each insert defining a rough-cutting circumferential cutter edge portion and a finish-cutting cutter radial edge portion, wherein the disk milling cutters simultaneously perform roughing and finishing cuts.

13. The milling cutter according to claim 12 wherein the cutter inserts comprise sets of circumferentially spaced cutter inserts, the sets being spaced apart in a direction radially with reference to the axis of rotation.

14. The milling tool according to claim 13 wherein a first set of cutter inserts is located closer to the axis than is a second set of the cutter inserts, the first set of cutter inserts being axially offset relative to the second set.

15. The milling tool according to claim 14 wherein the first set is disposed farther from a center line of the respective disk milling cutter than is the second set.

16. The milling tool according to claim 12 wherein each disk milling cutter includes two surfaces facing in opposite axial directions, each of the surfaces carrying some of the cutter inserts.

17. The milling tool according to claim 12 wherein there are only two disk milling cutters, the disk milling cutters forming two respective surfaces that face axially toward one another, each of the two surfaces carrying some of the cutter inserts.

18. The milling tool according to claim 17 wherein an axial spacing between the two disk milling cutters is adjustable.

19. The milling tool according to claim 18 wherein the two disk milling cutters are interconnected by a threaded adjusting sleeve for axially adjusting the two disk milling cutters relative to one another in response to rotation of the sleeve.

20. The milling tool according to claim 12 wherein the disk milling cutters are of identical configuration.

21. The milling tool according to claim 12 wherein the disk milling cutters are arranged such that the cutter inserts of one of the disk milling cutters are angularly offset with respect to the cutter inserts of another of the disk milling cutters.

* * * * *